United States Patent [19]

Kamiya

[11] Patent Number: 6,029,222

[45] Date of Patent: *Feb. 22, 2000

[54] METHOD AND PROCESSOR FOR SELECTIVELY MARKING INSTRUCTIONS AS INTERRUPTIBLE OR UNINTERRUPTIBLE AND JUDGING INTERRUPT REQUESTS BASED ON THE MARKED INSTRUCTION

[75] Inventor: Ryo Kamiya, Hamamatsu, Japan

[73] Assignee: Yamaha Corporation, Hamamatsu, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/781,718

[22] Filed: Jan. 10, 1997

[30] Foreign Application Priority Data

Jan. 17, 1996 [JP] Japan .................................. 8-006189

[51] Int. Cl.[7] ........................................................ G06F 9/30
[52] U.S. Cl. .......................... 710/262; 710/260; 710/261; 712/244
[58] Field of Search ...................................... 395/735, 591, 395/733–742; 710/260–269; 712/244

[56] References Cited

U.S. PATENT DOCUMENTS

| | | | |
|---|---|---|---|
| 3,578,918 | 5/1971 | Lucas et al. ............................ | 379/280 |
| 4,498,136 | 2/1985 | Sproul, III ............................... | 395/735 |
| 5,218,712 | 6/1993 | Cutler et al. ............................ | 395/734 |
| 5,471,595 | 11/1995 | Yagi et al. .............................. | 395/591 |
| 5,513,349 | 4/1996 | Horiguchi et al. ...................... | 395/733 |

FOREIGN PATENT DOCUMENTS 2247758A 3/1992 United Kingdom ............ G06F 15/16

*Primary Examiner*—Ayaz R. Sheikh
*Assistant Examiner*—Rydal D. Dharta
*Attorney, Agent, or Firm*—Pillsbury Madison & Sutro LLP

[57] ABSTRACT

Each of microcodes 1 has an interrupt prohibit bit 10 that specifies acceptance or nonacceptance of an interrupt request. Upon occurrence of an interrupt request, a processor refers to a value set in the interrupt prohibit bit 10 of the microcode 1 being currently executed. When "0" is set to the interrupt prohibit bit 10, the processor accepts the interrupt request, and when "1" is set to the interrupt prohibit bit 10, the processor rejects the interrupt request and starts executing a succeeding microcode. This allows the processor to safely execute certain instructions without interruption, as indicated by the interrupt prohibit bit 10 contained in the microcode 1 being currently executed.

8 Claims, 2 Drawing Sheets

1: MICROCODE

10: INTERRUPT PROHIBIT BIT

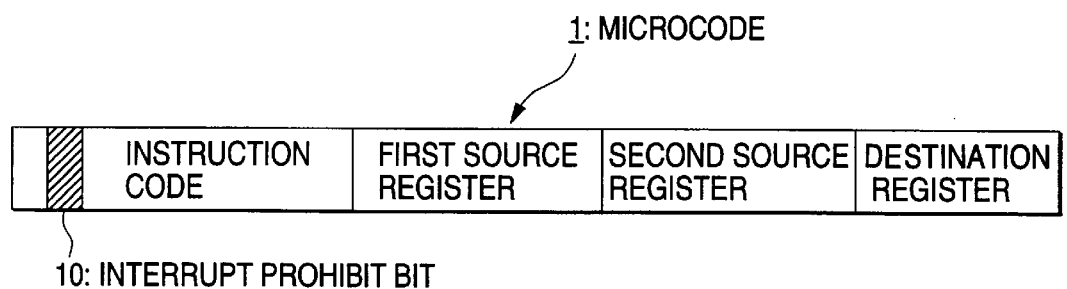

| LINE NUMBER | | | |
|---|---|---|---|
| 1 | TOP: | LOAD | R0, R1, R2, R3 |
| 2 | | DISABLE | |
| 3 | | FUNC1 | R4, R0, R1 |
| 4 | | FUNC1 | R5, R2, R3 |
| 5 | | FUNC1 | R4, R6, R7 |
| 6 | | FUNC1 | R5, R4, R8 |
| 7 | | FUNC1 | R5, R5, R2 |
| 8 | | FUNC1 | R5, R4, R1 |
| 9 | | STA | (R9+), R5 |
| 10 | | STA | (R9+), R5 |
| 11 | | STA | (R9+), R5 |
| 12 | | ENABLE | |
| 13 | | JNE | R9, R11, TOP |

# METHOD AND PROCESSOR FOR SELECTIVELY MARKING INSTRUCTIONS AS INTERRUPTIBLE OR UNINTERRUPTIBLE AND JUDGING INTERRUPT REQUESTS BASED ON THE MARKED INSTRUCTION

BACKGROUND OF THE INVENTION

1. Field of the invention

The invention relates not only to a processor that includes the function of concurrently executing a plurality of instructions by means of pipeline control or the like and an interrupt function, but also to an interrupt control method adapted for such processor.

2. Related art

Various types of processors such as pipeline processors that are capable of concurrently executing a plurality of instructions are known. According to these types of processors, instructions can be executed sequentially within a duration shorter than that required for executing the instructions on an individual basis. Therefore, the time required for executing the whole program can be reduced.

FIG. 3 shows an exemplary program prepared for such a type of processor capable of concurrently executing a plurality of instructions. Respective instructions constituting a program are sequentially executed by the processor in synchronism with a clock that is generated at a predetermined frequency. Further, the processor starts executing a succeeding instruction without waiting for the termination of a preceding instruction when these instructions are executed sequentially.

For example, the program has, on a third line from the head thereof, an instruction that reads: "Func1 R4, R0, R1". This instruction instructs the processor to "execute an operation "Func1" upon data stored in registers R0 and R1 and store the result in register R4", and requires three (3) clocks from the start to the end of the execution. Other instructions "Func1 . . . " are similar. The duration required for the execution of an instruction is indicated by an arrow per instruction in FIG. 3.

The processor starts executing the instruction on third line and then starts executing an instruction on fourth line "Func1 R5, R2, R3" without waiting for the termination of the instruction on third line. That is, the processor concurrently executes the instructions on third and fourth lines. The processor thereafter starts executing succeeding instructions sequentially every time a clock is generated.

Immediately before an instruction on sixth line from the head, "Func1 R5, R4, R8", is started, the instruction on third line is terminated, and the result of the operation Func1 is stored in register R4. Therefore, during the execution of the instruction on sixth line, the data stored in register R4 by the execution of the instruction on third line is referred to.

By the way, before starting to execute the instruction on sixth line, an instruction on fifth line, "Func1 R4, R6, R7", is started. The content of register R4 would be updated upon end of the instruction on fifth line.

However, the instruction on fifth line will not be terminated by the time the instruction on sixth line is started. Therefore, during the execution of the instruction on sixth line, it is the data stored in register R4 by the execution of the instruction on third line, not the result obtained by the execution of the instruction on fifth line, that is referred to as described above.

Then, upon end of a series of instructions "Func1 . . . ", three (3) instructions, "STA(R9+), R5", are executed. Each of these instructions instructs the processor to "add the content of register R5 to data in register R9 and store the sum in register R9". Further, the last instruction of the program is "JNE R9, R11, Top". This instruction instructs the processor to "jump to a line labeled "Top" when the content of register R9 does not coincide with the content of register R11. That is, this program is so looped as to repeat instructions from a line labeled "Top" to the last line until a predetermined condition prevails.

As described above, the processor capable of concurrently executing a plurality of instructions can start executing a succeeding instruction without waiting for the end of execution of a preceding instruction. Therefore, the execution time for the whole program can be reduced.

When a plurality of instructions are to be executed concurrently as described above, each instruction constituting the program must be executed at a predetermined timing so that the program can be executed regularly. However, in order to make the system flexible, the system must be designed so that interrupt requests are accepted to some degree, unless such system is designed to be dedicated to executing only a single type of program. The following methods have heretofore been proposed to meet this system design requirement.

(1) First Method

The first method is characterized as interposing a group of instructions between an instruction that specifies interrupt prohibit and an instruction that specifies interrupt prohibit reset so that a processor can respond to an interrupt request in accordance with these instructions. The group of instructions are in a program and their execution timings must not be changed. The program shown in FIG. 3 is designed so that interrupt control is implemented by this method. That is, the program has instructions "Disable" and "Enable". The former specifies interrupt prohibit and the latter specifies interrupt prohibit reset. No interrupt request is accepted at all during an interval between the start of the Disable instruction and the start of the Enable instruction.

(2) Second Method

The second method is characterized in that when an interrupt request occurs upon starting of an instruction, the processor is caused to execute an interrupt process while accepting the interrupt request, and the processor retroactively executes again all the past instructions having been concurrently executed together with the instruction being interrupted by the interrupt process.

(3) Third Method

The third method is characterized as giving priority to flexible acceptance of interrupt requests and giving up concurrent execution of a plurality of instructions. That is, the processor does not execute a succeeding instruction until a preceding instruction is terminated.

The first to third methods described above have the following shortcomings. First, as in the exemplary program shown in FIG. 3, if an interrupt prohibit instruction (Disable instruction) and an interrupt prohibit reset instruction (Enable instruction) are included in a loop process, the first method requires overhead operations for executing these instructions every time the loop makes one complete execution, and this impairs execution efficiency. Further, if there are many instructions that require a large number of predetermined clocks (i.e., instructions requiring a long execution time) in a group of instructions to be concurrently executed, the second method addresses the shortcoming that the execution is interrupted by an interrupt request at a high probability, which in turn increases the probability of executing the group of instructions again as a result of the interrupt process. Further, the third method has the shortcoming that the execution efficiency is low because concurrent execution is not executed.

SUMMARY OF THE INVENTION

The invention has been made in view of the aforementioned circumstances. The object of the invention is therefore to provide not only a processor capable of concurrently executing a plurality of instructions and capable of implementing high-speed and flexible processing by flexibly accepting interrupt requests while taking advantage of high-speed concurrent execution, but also an interrupt control method therefor.

The present invention is applied to a processor capable of concurrently executing a plurality of instructions, the processor comprising an interrupt control means, the interrupt control means causing the processor to judge, when an interrupt request occurs, whether the interrupt request is accepted or an instruction succeeding an instruction being currently executed is executed by rejecting the interrupt request based on interrupt control data included in the instruction being currently executed.

The present invention is applied to an interrupt control method for a processor capable of concurrently executing a plurality of instructions, wherein
  each instruction has interrupt control data specifying acceptance or nonacceptance of an interrupt request;
  the processor judges, when an interrupt request occurs, whether the interrupt request is accepted or an instruction succeeding an instruction being currently executed is executed by rejecting the interrupt request based on the interrupt control data included in the instruction being currently executed.

The present invention is applied to an interrupt control method for a processor, comprising the steps of: judging whether an instruction, out of instructions constituting a program, is executed continuously without being interrupted by an interrupt process based on a type of instruction; causing a computer to execute by means of software such a process as to set the interrupt control data to the instruction based on a result of the judgment; and supplying the processor with a program obtained by the process.

BRIEF DESCRIPTION OF THE DRAWINGS

FIG. 1 is a diagram showing a format of a microcode in a first mode of embodiment of the invention;

FIG. 2 is a diagram exemplifying a program for representing a microcode to be executed in a third mode of embodiment of the invention;

DETAILED DESCRIPTION OF THE PREFERRED EMBODIMENTS

Figures 3, 4:
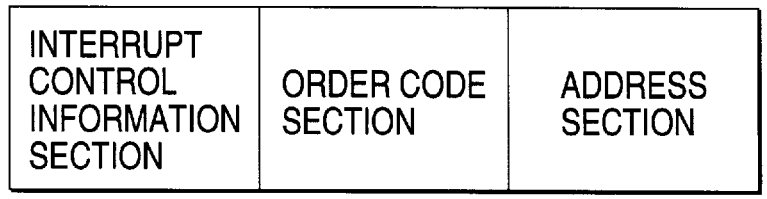
FIG. 3 is a diagram illustrative of a conventional interrupt control method.
FIG. 4 is a diagram showing an instruction format.

For a better understanding of the invention, modes of embodiment of the invention will now be described. These modes of embodiment are merely examples and will not therefore limit the invention; the invention can be arbitrarily modified within the scope and spirit thereof.

A. First Mode of Embodiment

The first mode of embodiment is characterized as applying the invention to a microprogrammed processor. In this mode of embodiment, an interrupt prohibit bit is included in a bit set of each of microcodes that are executed by the processor. FIG. 1 exemplifies the format of such microcode. In FIG. 1, reference numeral 1 denotes, e.g., a 32-bit microcode. As shown in FIG. 1, the microcode 1 includes: an instruction code indicating the type of instruction; the names of first and second source registers to which the processor refers during an operation; and the name of a destination register in which to store the result produced by the operation. Every microcode has a single-bit interrupt prohibit bit 10. Further, as shown in FIG. 4, the processor executes the instruction including an instruction format arranged subsequently in an interrupt control information section, an order code portion and an address portion.

The processor has an interrupt control means that, when an interrupt request occurs, judges whether such interrupt request is accepted or a microcode succeeding a microcode being currently executed is executed by rejecting such interrupt request based on the interrupt prohibit bit 10 included in the microcode being currently executed. That is, when an interrupt request occurs while the processor is executing a microcode whose interrupt prohibit bit 10 is set to "0", the processor accepts the interrupt request and executes an interrupt process under the control of the interrupt control means. On the other hand, when an interrupt request occurs while the processor is executing a microcode whose interrupt prohibit bit 10 is set to "1", the processor does not accept the interrupt request and continues to execute a microcode succeeding the microcode being currently executed.

Therefore, if there is a group of instructions to be executed continuously without accepting an interrupt request, the programmer must set the interrupt prohibit bit to "1" only for each instruction in such group of instructions. As a result of this technique, such group of instructions can be executed at predetermined timings without being interrupted by interrupt requests, whereas instructions other than such group of instructions are executed by accepting interrupt requests. Hence, interrupt requests can be flexibly accommodated, taking advantage of the concurrent execution of instructions.

B. Second Mode of Embodiment

The operation of preparing a program by codifying microcodes on a single code basis becomes harder as the program becomes larger. In addition, the operation of judging whether or not the interrupt prohibit bit is required to be set for microcodes constituting a program is extremely cumbersome. The object of this mode of embodiment is to give a solution to these problems and allow an interrupt control method of the invention to be executed with ease.

An interrupt control method, which is the second mode of embodiment, is executed in the following procedure using a compiler and a postprogram.

(1) First, a programmer prepares a source program that is formed of macroinstructions. A compiler is executed upon such source program. By executing the compiler, each of the macroinstructions in the source program is converted into a group of microcodes, so that a program formed of microcodes is generated. Here, while each macroinstruction is converted into a plurality of microcodes, the respective microcodes that are supposed to be concurrently executed as exemplified in FIG. 3 and are arranged so as to be intimately packed without gap in order to reduce execution time (i.e., the microcodes are arranged so as to minimize the number of NOPs). In addition, in this stage, each microcode has no data set to its interrupt prohibit bit; i.e., the interrupt prohibit bit is unfixed.

(2) A postprogram is executed upon the program consisting of the microcodes obtained in item (1). By executing the postprogram, either "1" or "0" is written to the interrupt prohibit bit of each microcode. The following are the details of this procedure.

a. First, the microcodes are read on a single basis from the head of the program. A predetermined number of clocks for executing each microcode is calculated based on the type of microcode.

b. Then, with respect to each of the microcodes constituting the program, a number of microcodes corresponding to the predetermined number of clocks starting from a concerned microcode, i.e., the microcodes that are to be concurrently executed together with the concerned microcode are checked. Then, it is judged whether or not there exists, among the microcodes to be executed concurrently, a microcode that affects the result produced by executing the program when an interrupt process is executed after the concerned microcode has been executed.

For example, let it be assumed that the concerned microcode (referred to as the "first microcode" for convenience) is an instruction designating register R0 as a destination register requiring three (3) clocks for execution. Further, let it be assumed that there is a microcode (referred to as the "second microcode" for convenience) designating register R0 as a source register within three (3) instructions counting from the first microcode. In this case, if an interrupt process is executed after the first microcode has been executed, then the first microcode has been terminated before the second microcode is executed, and the content of register R0 is updated. This is an unexpected operation. This unexpected operation may exclude the possibility of producing a result to be normally produced by the execution of the program. Therefore, in this case, the second microcode that is to be concurrently executed together with the first microcode is judged to be a microcode that affects the result produced by the execution of the program when an interrupt process is executed after the first microcode has been executed.

c. As a result of the judgment in item b, if, in a plurality of microcodes corresponding to the predetermined number of clocks starting from the concerned microcode, there is a microcode affecting the result produced by the execution of the program due to an interrupt, "1" is set to the interrupt prohibit bit of each of all the microcodes from the concerned microcode to such microcode affecting the result. Further, the microcodes whose interrupt prohibit bits are not set to "1" in this way have their interrupt prohibit bits set to "0".

C. Third Mode of Embodiment

In the second mode of embodiment, if each of the microcodes constituting the program is a microcode requiring a large number of clocks, then a program in which microcodes, each setting "1" to its interrupt prohibit bit, are continuously concatenated is obtained. When such program is executed, there is no chance for accepting interrupt requests at all. The third mode of embodiment has been proposed to eliminate this inconvenience.

That is, this mode of embodiment is characterized as presetting how many clocks an interrupt prohibit state is allowed to last prior to compiling. In the compiler, a NOP instruction that is not affected by an interrupt request at all is inserted into a bridging portion between macroinstructions, the last portion of a loop processing routine, and the like so that the aforementioned preset condition can be satisfied during the operation of converting a macroinstruction into microcodes. Since "1" is not set to the interrupt prohibit bit in each of these NOP instructions during the execution of the postprogram, a program having interrupt request accepting portions scattered here and there can be obtained. FIG. 2 shows an example of the thus obtained program. In FIG. 2, the shaded portions denote those having "1" set to the interrupt prohibit bit. Further, the NOP instructions have been inserted during compiling. Since "0" is set to the interrupt prohibit bit in these NOP instructions, an interrupt process is executed upon request of an interrupt.

As described in the foregoing, the present invention is provided as causing the processor to judge, when an interrupt request occurs, whether to accept the interrupt request or to execute an instruction succeeding an instruction being currently executed by rejecting the interrupt request based on interrupt control data in the instruction being currently executed. Therefore, interrupt requests can be flexibly accepted, taking advantage of high-speed concurrent execution to the fullest possible extent. That is, high-speed and flexible processing can be implemented. Further, the present invention is provided as automatically setting the interrupt control data based on a duration required for the execution of each of the instructions constituting the program. Therefore, the interrupt control method of the present invention can be implemented simply.

What is claimed is:

1. An interrupt control method for a processor capable of concurrently executing a plurality of instructions, the method comprising the steps of:

providing each instruction with interrupt control data to mark each instruction as interruptible or uninterruptible, wherein the interrupt control data is determined based on the type of the instruction being marked and the content of one or more instructions following the instruction being marked;

judging, based on the interrupt control data contained in the instruction being currently executed, whether the interrupt request is accepted or an instruction succeeding the instruction being currently executed is executed by rejecting the interruption request when an interrupt request occurs;

determining whether an instruction, out of a plurality of instructions constituting a program, is executed continuously without being interrupted by an interrupt process based on a type of the instruction;

executing a process to set the interrupt control data to the instruction based on a result of the determination; and supplying the processor with a program obtained by the execution, wherein the type of the instruction being marked determines a number of clocks that the instruction being marked needs to complete an operation performed by the instruction being marked, the number of clocks being used to determine the interrupt control data.

2. An interrupt control method for a processor according to claim 1, further comprising the steps of:

setting a period of an interrupt prohibit state; and inserting a NOP instruction in order to cut off the period of the interrupt prohibit state and allow interrupt requests to be accepted.

3. An interrupt control method for a processor as claimed in claim 2, wherein the NOP instruction is inserted into one of a bridging portion between macroinstructions and the last portion of a loop processing routine.

4. An interrupt control method for a processor capable of concurrently executing a plurality of instructions as claimed in claim 1, wherein the processor executes the instruction having an instruction format arranged subsequently in an interrupt control information section, an order code portion, and an address portion.

5. A processor capable of concurrently executing a plurality of instructions, the processor comprising:

providing means for providing each instruction with interrupt control data to mark each instruction as interruptible or uninterruptible, wherein the interrupt control data is determined based on the type of the instruction being marked and the content of one or more instructions following the instruction being marked;

interrupt control means for judging, based on the interrupt control data contained in the instruction being currently executed, whether the interrupt request is accepted or an instruction succeeding the instruction being currently executed is executed by rejecting the interruption request when an interrupt request occurs;

control means for judging whether an instruction, out of a plurality of instructions constituting a program, is executed continuously without being interrupted by an interrupt process based on a type of the instruction;

executing means for executing a process to set the interrupt control data to the instruction based on a result of the judgment performed by the control means; and supplying means for supplying the processor with a program obtained by the execution of the executing means, wherein the type of the instruction being marked determines a number of clocks that the instruction being marked needs to complete an operation performed by the instruction being marked, the number of clocks being used to determine the interrupt control data.

6. A processor capable of concurrently executing a plurality of instructions according to claim 5 further comprising:

setting means for setting a period of an interrupt prohibit state; and inserting means for inserting a NOP instruction in order to cut off the period of the interrupt prohibit state and allow interrupt requests to be accepted.

7. A processor capable of concurrently executing a plurality of instructions as claimed in claim 6, wherein the NOP instruction is inserted into one of a bridging portion between macroinstructions and the last portion of a loop processing routine.

8. A processor capable of concurrently executing a plurality of instructions as claimed in claim 5, wherein the processor executes the instruction having an instruction format arranged subsequently in an interrupt control information section, an order code portion, and an address portion.

* * * * *